(12) United States Patent
Wilson et al.

(10) Patent No.: US 11,173,568 B2
(45) Date of Patent: Nov. 16, 2021

(54) COMPOSITE METAL FLEXPLATE

(71) Applicant: GM GLOBAL TECHNOLOGY OPERATIONS LLC, Detroit, MI (US)

(72) Inventors: Daniel J. Wilson, Linden, MI (US); Huaxin Li, Rochester Hills, MI (US); Jianghuai Yang, Rochester Hills, MI (US); James D. Cremonesi, Rochester Hills, MI (US); Qigui Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 513 days.

(21) Appl. No.: 16/032,880

(22) Filed: Jul. 11, 2018

(65) Prior Publication Data

US 2020/0016688 A1 Jan. 16, 2020

(51) Int. Cl.
| | |
|---|---|
| *F16H 55/06* | (2006.01) |
| *B23K 20/12* | (2006.01) |
| *F16D 3/79* | (2006.01) |
| *F16H 55/17* | (2006.01) |
| *F16F 15/30* | (2006.01) |

(52) U.S. Cl.
CPC ............. *B23K 20/129* (2013.01); *F16D 3/79* (2013.01); *F16F 15/30* (2013.01); *F16H 55/06* (2013.01); *F16H 55/17* (2013.01); *F16D 2250/0061* (2013.01)

(58) Field of Classification Search
CPC .................................................. B23K 20/129
See application file for complete search history.

(56) References Cited

U.S. PATENT DOCUMENTS 5,271,287 A * 12/1993 Wadleigh ............... B23K 20/12
  474/152
6,343,418 B1 * 2/2002 Hitomi ................... A01K 89/01
  164/98

(Continued)

FOREIGN PATENT DOCUMENTS

| CN | 203743305 U | 7/2014 |
| CN | 104854371 A | 8/2015 |

(Continued)

*Primary Examiner* — William Kelleher
*Assistant Examiner* — Gregory T Prather
(74) *Attorney, Agent, or Firm* — Vivacqua Crane, PLLC (57) ABSTRACT

A composite metal flexplate is disclosed that includes an aluminum center plate and a steel ring gear joined to the aluminum center plate by a solid-state joint. The solid-state joint that joins together the aluminum center plate and the steel ring gear may be formed by friction welding. During the friction welding process, a surface of an annular body of the steel ring gear is preheated, followed by bringing the preheated surface of the annular body into contact with a surface of a periphery of a circular body of the aluminum center plate. The two contacting surfaces are then caused to experience relative rotational contacting movement, which generates frictional heat therebetween and softens adjacent regions of the steel ring gear and the aluminum center plate. Once this occurs, an applied force is administered to compress and forge the contacting surfaces together, thereby establishing the solid-state joint.

8 Claims, 5 Drawing Sheets

(56) References Cited

U.S. PATENT DOCUMENTS

| | | | |
|---|---|---|---|
| 7,021,171 B2* | 4/2006 | Huber | B21D 22/16 |
| | | | 72/208 |
| 9,296,157 B1* | 3/2016 | Handschuh | B29C 70/84 |
| 10,412,944 B2* | 9/2019 | Saito | F16H 55/17 |
| 2007/0277644 A1 | 12/2007 | King et al. | |
| 2008/0166579 A1* | 7/2008 | Kotthoff | B22F 7/06 |
| | | | 428/547 |
| 2014/0083222 A1* | 3/2014 | Cleeves | F02B 75/282 |
| | | | 74/421 R |
| 2014/0291430 A1* | 10/2014 | Takamatsu | A01K 89/015 |
| | | | 242/283 |
| 2015/0183065 A1* | 7/2015 | Chavdar | B21K 1/30 |
| | | | 74/460 |
| 2015/0198193 A1* | 7/2015 | Szuba | F16B 17/00 |
| | | | 403/280 |
| 2015/0258642 A1* | 9/2015 | Killian | B23K 20/127 |
| | | | 29/893.34 |
| 2015/0323053 A1* | 11/2015 | El-Wardany | B33Y 80/00 |
| | | | 74/457 |
| 2015/0362057 A1* | 12/2015 | Wesling | B62M 9/10 |
| | | | 474/152 |
| 2016/0368082 A1* | 12/2016 | Li | B23K 20/129 |
| 2018/0180159 A1* | 6/2018 | Tu | F16H 55/30 |
| 2018/0245680 A1* | 8/2018 | Britzger | F16H 55/17 |
| 2018/0297119 A1* | 10/2018 | Clarke | B22F 5/08 |
| 2018/0320772 A1* | 11/2018 | Anand | F16H 55/02 |
| 2019/0126386 A1* | 5/2019 | Li | B23K 20/12 |
| 2019/0337088 A1* | 11/2019 | Li | B23K 20/1275 |
| 2020/0240505 A1* | 7/2020 | Magni | B22D 19/16 |
| 2020/0324358 A1* | 10/2020 | Li | B23K 11/26 |

FOREIGN PATENT DOCUMENTS

| | | |
|---|---|---|
| CN | 105402311 A | 3/2016 |
| DE | 102013202583 B3 | 7/2017 |
| DE | 102016224386 A1 | 6/2018 |
| WO | 2008049010 A2 | 4/2008 |

* cited by examiner

COMPOSITE METAL FLEXPLATE

INTRODUCTION

Many automobiles rely on an automatic transmission to implement torque conversions between the internal combustion engine and the downstream components of the drivetrain. To establish torque transfer between the internal combustion engine and the automatic transmission, a torque converter is used to fluidly couple a crankshaft, which is rotationally driven by the internal combustion engine, and an input shaft of the automatic transmission, which delivers torque to an output shaft of the transmission through a planetary gear train. The crankshaft is secured to a front cover of a torque converter housing by a flexplate. In general, a flexplate includes a disc-shaped center plate and a surrounding ring gear. The center plate includes a circular body that defines a central opening—as well as various other holes and cutouts for mounting and weight reduction/balancing—and is able to flex in the axial direction to accommodate the motion of the torque converter as vehicle speeds fluctuate. The ring gear includes an annular body that is affixed to an outer periphery of the circular body of the center plate. The external gear teeth of the ring gear allow a pinion gear of the vehicle starter motor to selectively rotate the flexplate when activated to initiate operation of the engine under its own power. The disc-shaped center plate and the ring gear have each conventionally been formed from steel, enabling them to be MIG welded or laser welded together along their interface.

SUMMARY OF THE DISCLOSURE

A composite metal flexplate according to one embodiment of the present disclosure may include an aluminum center plate and a steel ring gear. The aluminum center plate has a circular body that defines a central opening about an axis of rotation of the composite metal flexplate. The circular body also has a periphery. The steel ring gear includes an annular body and external gear teeth that are integral with and circumferentially disposed about the annular body. Moreover, the annular body of the steel ring gear is affixed to the periphery of the circular body of the aluminum center plate by a solid-state joint.

The composite metal flexplate may be further defined. For example, the periphery of the circular body of the aluminum center plate may comprise an axial rim that extends axially from a distal end of the circular body, and the solid-state joint may be established between the axial rim of the circular body and the annular body of the steel ring gear. As another example, the periphery of the circular body may comprise an axial rim that extends axially from a distal end of the circular body, a radial rim that extends radially outwardly from the axial rim and is axially offset from the distal end of the circular body, and the solid-state joint may be established between at least one of the axial rim or the radial rim of the circular body of the aluminum center plate and the annular body of the steel ring gear. In still another example, the annular body of the steel ring gear may comprise a main annular portion and a radial rim that extends radially inwardly from the main annular portion, and the solid-state joint may be established between the circular body of the aluminum center plate and at least one of the main annular portion or the radial rim of the annular body of the steel ring gear.

A method of making a composite metal flexplate according to aspects of the present disclosure may include several steps. In one step, a surface of an annular body of a steel ring gear is heated. In another step, the surface of the annular body of the steel ring gear is brought into contact with a surface of a periphery of a circular body of the aluminum center plate while the surface of the annular body of the steel ring gear is still heated. In still another step, one of the aluminum center plate or the steel ring gear is rotated, while the other of the aluminum center plate or the steel ring gear remains stationary, so as to generate frictional heat between the contacting surfaces of the annular body of the steel ring gear and the periphery of the circular body of the aluminum center plate. The generated frictional heat produces adjacent softened regions in the annular body of the steel ring gear and the circular body of the aluminum center plate. And, in yet another step, a force is applied to the contacting surfaces of the annular body of the steel ring gear and the periphery of the circular body of the aluminum center plate to plastically deform the softened regions and to forge together the contacting surfaces of the annular body of the steel ring gear and the periphery of the circular body of the aluminum center plate to form a solid-state joint upon cooling and hardening of the softened regions.

The method of making the composite metal flexplate may include additional steps or be further defined. In one implementation, the steel ring gear may be rotated while the aluminum center plate is held stationary. In another variation, the periphery of the circular body of the aluminum center plate may include an axial rim that extends axially from a distal end of the circular body. The axial rim has an outer surface that contacts an inner surface of the annular body of the steel ring gear. In that regard, rotating one of the aluminum center plate or the steel ring gear results in relative contacting rotational movement between the outer surface of the axial rim and the inner surface of the annular body of the steel ring gear to generate frictional heat therebetween. In still another variance, the periphery of the circular body of the aluminum center plate may include an axial rim that extends axially from a distal end of the circular body, and may further include a radial rim that extends radially outwardly from the axial rim and is axially offset from the distal end of the circular body. As such, rotating one of the aluminum center plate or the steel ring gear results in relative contacting rotational movement between at least one of (1) an outer surface of the axial rim and an inner surface of the annular body of the steel ring gear to generate frictional heat therebetween or (2) a front surface of the radial rim and a side surface of the annular body of the steel ring gear to generate frictional heat therebetween. In yet another variance, the annular body of the steel ring gear may include a main annular portion and a radial rim that extends radially inwardly from the main annular portion. To that end, rotating one of the aluminum center plate or the steel ring gear results in relative contacting rotational movement between at least one of (1) a back surface of an annular terminal region of the circular body of the aluminum center plate and a front surface of the radial rim of the annular body of the steel ring gear to generate frictional heat therebetween or (2) an inner surface of the main annular portion of the annular body of the steel ring gear and a circumferential edge surface of the distal end of the circular body of the aluminum center plate to generate frictional heat therebetween.

The method of making the composite metal flexplate may also comprise heating the surface of the annular body of the steel ring gear by induction heating. Additionally, the surface of the annular body of the steel ring gear may have a temperature between 200° C. and 580° C. when brought into contact with the surface of a periphery of the circular body of the aluminum center plate. The aluminum center plate included in the composite metal flexplate may also define a central opening about an axis of rotation of the composite metal flexplate, a first set of mounting holes proximate the central opening, and a second set of mounting holes proximate the periphery of the circular body. Still further, a dimensional control member may be disposed against a surface of the circular body of the aluminum center plate to resist distortion of the circular body when applying the force that plastically deforms the softened regions and forges together the contacting surfaces of the annular body of the steel ring gear and the periphery of the circular body of the aluminum center plate.

Another method of making a composite metal flexplate according to aspects of the present disclosure may include several steps. In one step, a steel ring gear is provided that includes an annular body and external gear teeth that are integral with and circumferentially disposed about the annular body. In another step, an aluminum center plate is provided that includes a circular body having a periphery, the circular body defining a central opening, a first set of mounting holes proximate the central opening, and a second set of mounting holes proximate the periphery. In another step, a surface of the annular body of the steel ring gear is heated to a temperature above 200° C. In still another step, the surface of the annular body of the steel ring gear and a surface of the periphery of the circular body of the aluminum center plate are rotated relative to each other, while the surfaces are in contact with each other and the temperature of the surface of the annular body is between 200° C. and 580° C., with either the steel ring gear or the aluminum center plate being held stationary, so as to generate frictional heat between the surfaces of the annular body of the steel ring gear and the periphery of the circular body of the aluminum center plate. The generated frictional heat produces adjacent softened regions in the annular body of the steel ring gear and the circular body of the aluminum center plate. And, in yet another step, a force is applied to the surfaces of the annular body of the steel ring gear and the periphery of the circular body of the aluminum center plate that are in contact with each other to plastically deform the adjacent softened regions and to forge together the surfaces of the annular body of the steel ring gear and the periphery of the circular body of the aluminum center plate to form a solid-state joint upon cooling and hardening of the softened regions The method of making the composite metal flexplate may include additional steps or be further defined. For instance, the periphery of the circular body of the aluminum center plate may include an axial rim that extends axially from a distal end of the circular body. The axial rim has an outer surface that contacts an inner surface of the annular body of the steel ring gear. In that regard, rotating one of the aluminum center plate or the steel ring gear results in relative contacting rotational movement between the outer surface of the axial rim and the inner surface of the annular body of the steel ring gear to generate frictional heat therebetween. In another variance, the periphery of the circular body of the aluminum center plate may include an axial rim that extends axially from a distal end of the circular body, and may further include a radial rim that extends radially outwardly from the axial rim and is axially offset from the distal end of the circular body. As such, rotating one of the aluminum center plate or the steel ring gear results in relative contacting rotational movement between at least one of (1) an outer surface of the axial rim and an inner surface of the annular body of the steel ring gear to generate frictional heat therebetween or (2) a front surface of the radial rim and a side surface of the annular body of the steel ring gear to generate frictional heat therebetween. In still another variance, the annular body of the steel ring gear may include a main annular portion and a radial rim that extends radially inwardly from the main annular portion. To that end, rotating one of the aluminum center plate or the steel ring gear results in relative contacting rotational movement between at least one of (1) a back surface of an annular terminal region of the circular body of the aluminum center plate and a front surface of the radial rim of the annular body of the steel ring gear to generate frictional heat therebetween or (2) an inner surface of the main annular portion of the annular body of the steel ring gear and a circumferential edge surface of the distal end of the circular body of the aluminum center plate to generate frictional heat therebetween. Additionally, a dimensional control member may be disposed against a surface of the circular body of the aluminum center plate to resist distortion of the circular body when applying the force that plastically deforms the softened regions and forges together the surfaces of the annular body of the steel ring gear and the periphery of the circular body of the aluminum center plate that are in contact with each other.

DETAILED DESCRIPTION

A composite metal flexplate is disclosed that includes an aluminum center plate and a steel ring gear. The steel ring gear is affixed to the aluminum center plate by a solid-state joint in which material from the aluminum center plate and the steel ring gear are atomically interdispersed. Because the steel ring gear and the aluminum center plate are affixed by a solid-state joint, brittle Fe—Al intermetallic compounds are only minimally present, if at all, within the joint established between the two components, which helps ensure that the joint is strong and can resist fracturing when the flexplate is cranked by the starter motor under normal operating conditions. To establish the solid-state joint between the steel ring gear and the aluminum center plate, the two dissimilar metal components may be friction welded together. The friction welding process involves pre-heating the body of the steel ring gear followed by rotating either the steel ring gear or the aluminum center plate, with the other component being held stationary, while the body of the ring gear and a periphery of a circular body of the center plate are in contact with each other such that frictional heat is generated therebetween. After halting rotation of the rotating component, pressure is immediately applied to the contacting portions of the two components to essentially forge together the annular body of the steel ring gear and the periphery of the circular body of the aluminum center plate.

Figure 1:
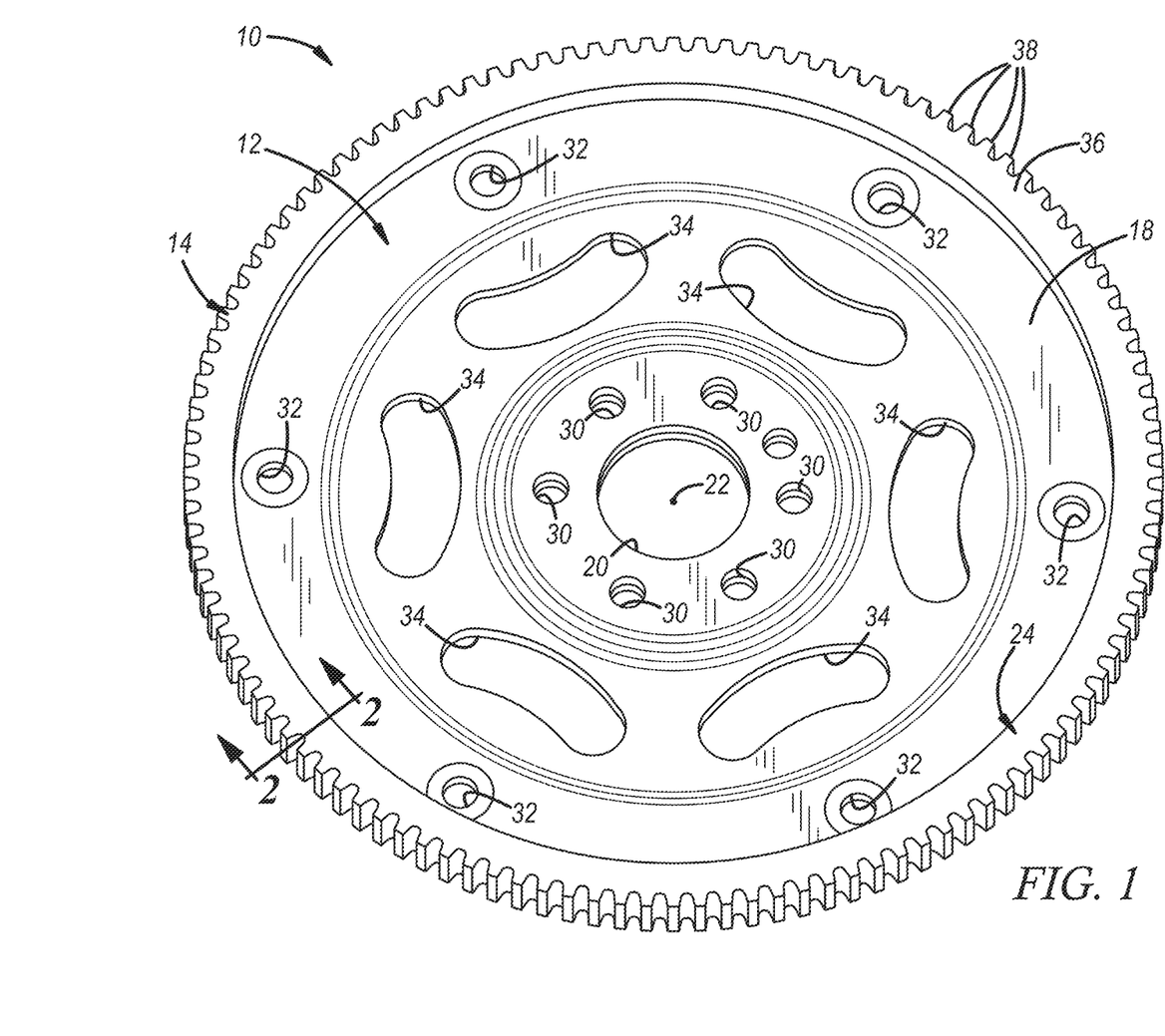
FIG. 1 is a perspective view of a composite metal flexplate that includes an aluminum center plate and a steel ring gear disposed circumferentially around and affixed to a periphery of the aluminum center plate by a solid-state joint according to one embodiment of the present disclosure.
Figure 2:
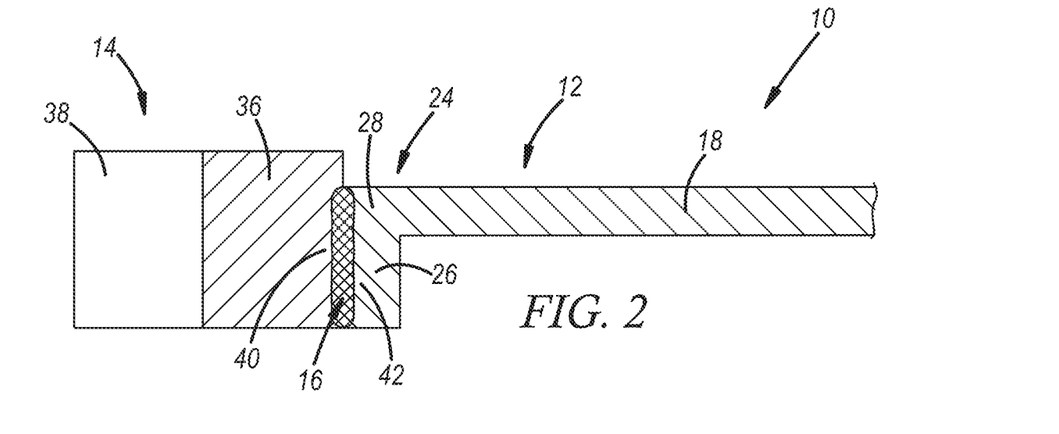
FIG. 2 is a partial cross-sectional view of the composite metal flexplate of FIG. 1, which is taken along section lines 2-2, showing the steel ring gear affixed to the aluminum center plate.
Figure 3:
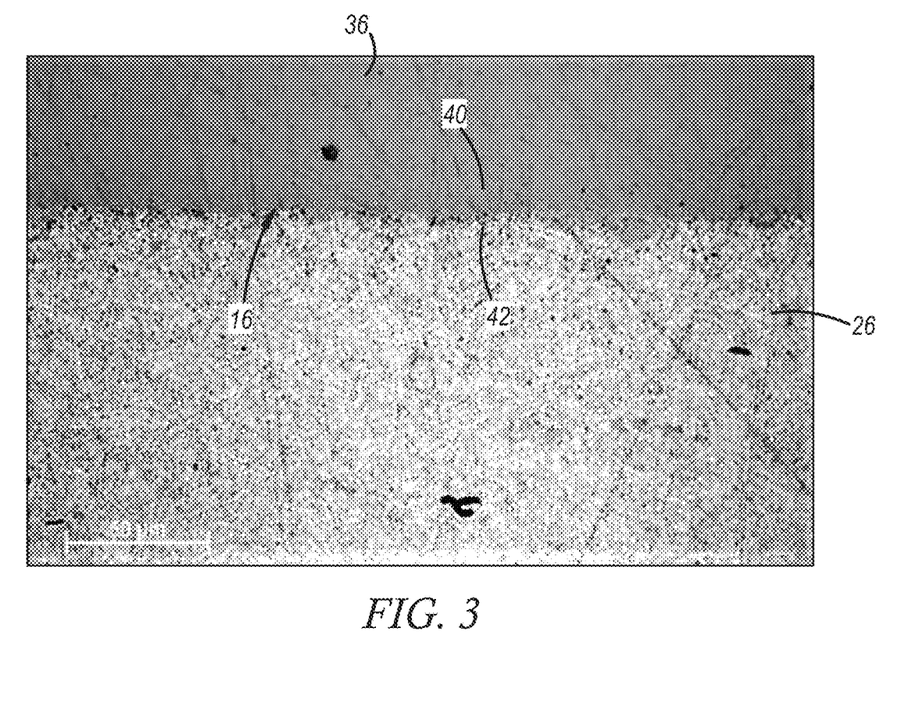
FIG. 3 is a photomicrograph depicting the solid-state joint in FIG. 2 that joins together the steel ring gear and the aluminum center plate.

FIGS. 1-3 depict a composite metal flexplate 10 according to one embodiment of the present disclosure. The composite metal flexplate 10 includes an aluminum center plate 12 and a steel ring gear 14 that surrounds and is affixed to the aluminum center plate 12 by a solid-state joint 16. The aluminum center plate 12 may be composed from any of a wide variety of aluminum alloy compositions including heat-treatable aluminum alloys (e.g., AA 2000, certain 4000, 6000, and 7000 series aluminum alloys) and non-heat-treatable aluminum alloys (AA 3000, certain 4000, and 5000 series aluminum alloys). Several specific and non-limiting aluminum alloy compositions that may be employed include AA2014-T6, AA4032-T6, and AA7050-T6. The steel ring gear 14 may be composed of a steel composition that possess or can be treated to possess the strength and toughness properties required to support the function of the ring gear 14. For example, the steel ring gear 14 may be composed of a medium carbon plain steel that includes, for example, 0.30 wt % to 0.55 wt % carbon, or a medium carbon alloyed steel that includes a similar carbon content. Several specific and non-limiting steel compositions that may be employed include SAE J405 1035-1050 steel alloys.

The aluminum center plate 12 includes a circular body 18 that is preferably fabricated by stamping. The circular body 18 defines a central opening 20 about an axis of rotation 22 of both the body 18 and the composite metal flexplate 10, and has a periphery 24 that includes an axial rim 26 extending axially from a distal end 28 of the body 18. Additionally, the circular body 18 defines a first set of mounting holes 30 proximate to and surrounding the central opening 20, a second set of mounting holes 32 radially-outwardly spaced from the first set of mounting holes 30 and proximate the distal end 28 of the circular body 18, and a plurality of circumferentially-spaced cutouts 34 located between the first and second sets of mounting holes 30, 32 that reduce and properly distribute the weight of the center plate 12. When installed, the first set of mounting holes 32 receives bolts (not shown) that secure the aluminum center plate 12 to a crank flange on one side of the plate 12, and the second set of mounting holes 34 receives bolts that secure the aluminum center plate 12 to the front cover of a torque converter housing. The central opening 20 receives a pilot bushing that accommodates a pilot hub of the torque converter and serves to align a longitudinal axis of the engine crankshaft and a longitudinal axis of the transmission input shaft.

The steel ring gear 14 includes an annular body 36 and external gear teeth 38 that are integral with and circumferentially disposed about the annular body 36. Each of the external gear teeth 38 protrudes radially outwardly from the annular body 36 of the ring gear 14 and extends axially along a thickness dimension of the annular body 36. The gear teeth 38 are typically hardened by induction hardening or some other hardening procedure while the annular body 36 that supports the gear teeth 38 is typically not hardened so that it can more easily participate in formation of the solid-state joint 16. Depending on the design specification of the composite metal flexplate 10, which takes into account a multitude of factors including the requisite ring gear circumference, the number of external gear teeth 38 supported on the annular body 36 of the ring gear 14 may number anywhere from 100 to 200. In this particular embodiment of the composite metal flexplate 10, and as shown best in FIG. 2, an inside wall portion 40 of the annular body 36 of the ring gear 14 is joined to an outside wall portion 42 of the axial rim 26 of the circular body 18 of the center plate 12 by the solid-state joint 16. The solid-state joint 16, as shown in the magnified photomicrograph of FIG. 3, is metallurgical transition region between the annular body 38 of the ring gear 14 and the axial rim 26 of the circular body 18 where aluminum alloy and steel are atomically interdispersed with minimal or no Fe—Al intermetallic compounds present.

The solid-state joint 16 is preferably formed between the aluminum center plate 12 and the steel ring gear 14 by friction welding. As will be described in more detail below, friction welding is a solid-state joining operation in which two metal components—one of which is held stationary while the other is rotated—experience relative contacting rotational movement between contacting portions of the components to generate frictional heat. The generated heat softens one or both of the components so that an applied pressure or upset force can plastically displace material from one or both of the components to forge the two contacting portions together and compel the atomic interdispersion that typifies the solid-state joint 16. The friction welding process applicable here may include at least a pre-heating step, a friction heating step, and a pressure application step. These steps are depicted generally in FIGS. 4-6 in connection with fabricating the composite metal flexplate 10 illustrated in FIGS. 1-3. Of course, the same process may be used to fabricate other alternative embodiments of the composite metal flexplate, some of which are described below in connection with FIGS. 7-10.

Figure 4:
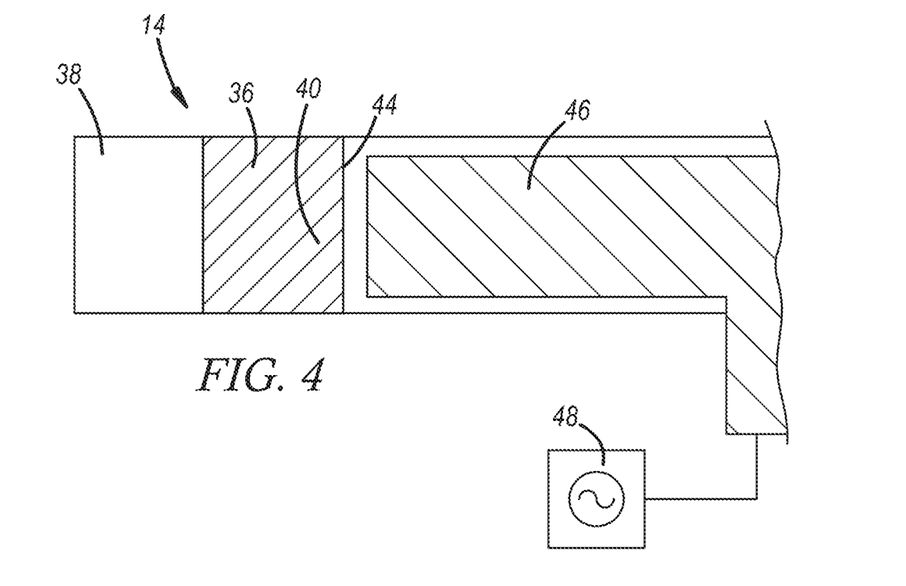
FIG. 4 is a partial cross-sectional illustration depicting the step of the friction welding process in which a surface of the annular body of the steel ring gear is preheated according to one embodiment of the present disclosure.

The pre-heating step is illustrated in FIG. 4. In this step, an inner surface 44 of the annular body 36 of the ring gear 14 is heated in preparation for joining. The inner surface 44 identified here in the un-joined steel ring gear 14 eventually becomes fully or partially integrated into the solid-state joint 16, and, consequently, loses its distinct interfacial boundary, as the inside wall portion 40 of the annular body 36 and the outside wall portion 42 of the axial rim 26 of the circular body 18 of the aluminum center plate 12 are forged together. The inner surface 44 of the annular body 36 may be heated by induction heating to a temperature above 200° C. or, more specifically, between 200° C. and 700° C. This may involve placing an induction coil 46, such as an electromagnetic copper coil, adjacent to the inner surface 44 of the annular body 36, and then passing a high-frequency AC current provided by a radio-frequency (RF) power supply 48 through the induction coil 46. The passage of the AC current through the conduction coil 46 creates an alternating magnetic field that penetrates the annular body 36 and generates eddy currents that resistively heat the inner surface 44 together with some additional heating through magnetic hysteresis. The targeted heating of the inner surface 44 of the annular body 36 to the its elevated temperature—as opposed to heating the entire ring gear 14 uniformly—is useful here since it may be desirable to limit the heating of the external gear teeth 38 as much as possible to avoid tempering back their hardness in those situations where the gear teeth 38 have already been hardened via heating and quenching to affect changes in steel microstructure.

Figure 5:
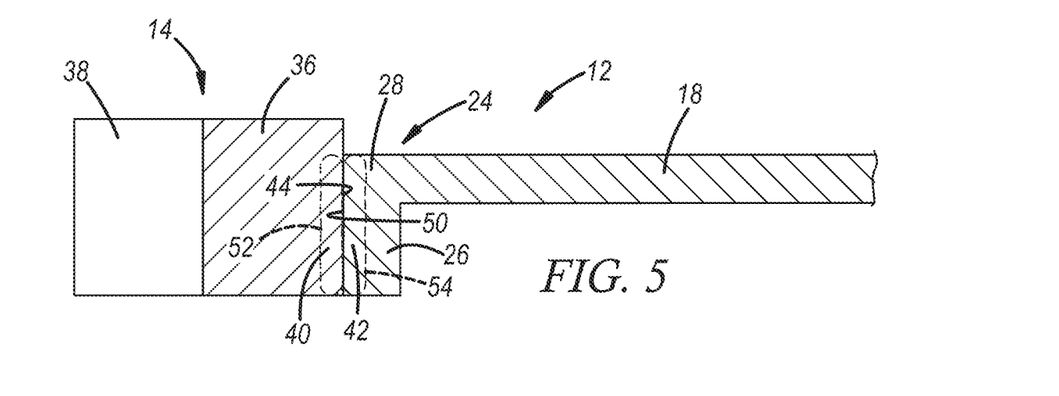
FIG. 5 is a partial cross-sectional illustration depicting the step of the friction welding process in which the steel ring gear and the aluminum center plate are rotated relative to one another while surfaces of those two components are in contact according to one embodiment of the present disclosure.

While the inner surface 44 of the annular body 36 is still at an elevated temperature between 200° C. and 580° C. (thus allowing for some cooling if the originally heated to above 580° C.), the friction heating step is performed, as depicted in FIG. 5. In the friction heating step, the pre-heated (200° C.-580° C.) inner surface 44 of the annular body 36 of the steel ring gear 14 is located adjacent to and in contact with an outer surface 50 of the axial rim 26 of the circular body 18 of the aluminum center plate 12. Like the inner surface 44 of the annular body 36, the outer surface 50 of the axial rim 26 of the un-joined aluminum center plate 12 eventually becomes fully or partially integrated into the solid-state joint 16 as the inside wall portion 40 of the annular body 36 and the outside wall portion 42 of the axial rim 26 are forged together. Once contact has been established between the inner surface 44 of the annular body 36 and the outer surface 50 of the axial rim 26, one of the aluminum center plate 12 or the steel ring gear 14 is rotated, while the other of the aluminum center plate 12 or the steel ring gear 14 is held stationary. The relative contacting rotational movement experienced between the inner surface 44 of the annular body 36 and the outer surface 50 of the axial rim 26 of the circular body 18 generates frictional heat between those surfaces 44, 50. This frictionally-generated heat softens adjacent regions 52, 54 of the annular body 36 and the axial rim 26 extending into the annular body 36 from the outer surface 44 and into the axial rim 26 from the inner surface 50, respectively. Timely softening of the annular body 36 of the steel ring gear 14 is made possible by the advanced heating of the inner surface 44 in the preheating step.

The aluminum center plate 12 and the steel ring gear 14 can be fixtured and rotated relative to one another with conventional friction welding tooling. For example, in a preferred embodiment, the aluminum center plate 12 is held stationary and the steel ring gear 14 is rotated. To that end, the aluminum center plate 12 may be lowered onto a support block (not shown). The support block may include guide or locating rods that are received in one or more of the first and/or second sets of mounting holes 30, 32 defined in the circular body 18 of the center plate 12. Additional clamping equipment may further be used to tightly hold the aluminum center plate 12 against the support block so that it remains stationary during the friction heating step. As for the steel ring gear 14, it may be fixedly braced or clamped to an annular retention member (not shown), which in turn is mounted to a rigid spindle. The preheating step may be practiced while the steel ring gear 14 is installed on the spindle to prevent substantial heat loss during the time that elapses between the preheating and friction heating steps. Eventually, the steel ring gear 14 is moved towards the aluminum center plate 12 until the inner surface 44 of the annular body 36 and the outer surface 50 of the axial rim 26 of circular body 18 are in axially aligned contact. At that point, rotation of the spindle is commenced, which causes the desired relative contacting rotational movement between the inner surface 44 of the annular body 36 and the outer surface 50 of the axial rim 26. The speed and duration of spindle rotation is controlled to achieve the requisite softened regions 52, 54 in each of the center plate 12 and the ring gear 14.

Figure 6:
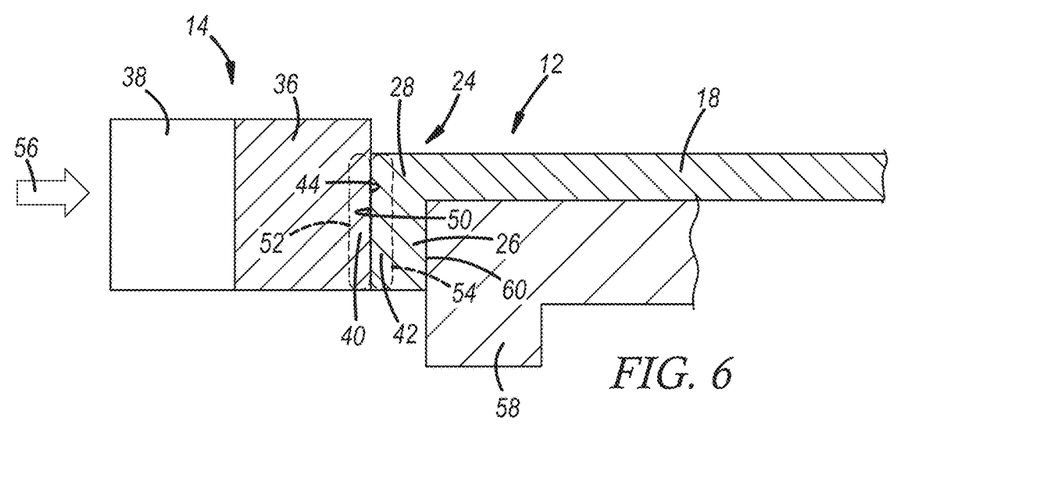
FIG. 6 is a partial cross-sectional illustration depicting the step of the friction welding process in which the surfaces of the steel ring gear and the aluminum center plate that have been rotated relative to one another while in contact are pressed together under an applied force to forge those surfaces together according to one embodiment of the disclosure.

After the softened regions 50, 52 have been attained through relative rotational frictional contact, the pressure application step is performed, as illustrated in FIG. 6. In this step, the inner surface 44 of the annular body 36 and the outer surface 50 of the axial rim 26 of the circular body 18 are pressed together under an applied force 56. The inner surface 44 and the outer surface 50 are pressed together with enough force to cause plastic deformation of the compressed softened regions 52, 54 of the annular body 36 and the axial rim 26 and to forge together the inner and outer surfaces 44, 50. The applied force 56 may be administered by pressing radially-inwardly against the external teeth 38 of the steel ring gear 14, preferably hydraulically, in opposition to the resisting force of the axial rim 26 of the circular body 18. This radially-inward pressing force against the external teeth 38 may be applied simultaneously around the entire circumference of the ring gear 14 or, in a variation, may be applied to multiple defined arcs of the circumference of the ring gear 14 in succession until the entire circumference of the ring gear 14 has been pressed. Additionally, if needed to prevent distortion of the axial rim 26, a dimensional control member 58 in the form of a block, plate, ring, or other suitable shape may be disposed against the inner surface 60 of the axial rim 26 to counteract the pressure being applied radially inwardly against the external teeth 38 of the ring gear 14.

During the pressure application step, and possibly for a short time afterwards, the softened regions 52, 54, which are now plastically deformed, cool and harden into the solid-state joint 26. The composite metal flexplate 10 is now formed and can be removed from the friction welding tooling. Additional processing of the composite metal flexplate 10 may be performed at this time. For example, any metal flash that may have resulted from compressing and plastically deforming of the softened regions 52, 54 of the annular body 36 and the axial rim 26 may be removed. Such flash removal can be done in any of a variety of ways including shearing, machining, or grinding, to name but a few options. As another example, the external gear teeth 38 of the steel ring gear 14 may be hardened if by some chance they have not already been hardened prior to friction welding the steel ring gear 14 and the aluminum center plate 12 together. The hardening of the external gear teeth 38—whether performed before or after friction welding—typically involves induction heating the gear teeth 38 followed by quenching the gear teach 38 in a water-based polymer solution, which contains rust inhibitors, and then inducting tempering the teeth 38 to the desired surface hardness. Still further, as yet another example of a post-friction welding procedure, the composite metal flexplate 10, as least in the exposed areas of the solid-state joint 16, may be treated by stress relief, annealing, or coating to protect the joint 16 from premature corrosion.

The friction welding process described above is subject to a number of possible variations. Most notably, when practicing the friction heating step, the steel ring gear 14 can be held stationary while the aluminum center 12 plate is rotated. To perform the friction heating step in this way, the steel ring gear 14 would be held tightly against the support block by clamps or other retaining equipment, and the aluminum center plate 12 would be mounted onto the rigid spindle preferably through the central opening 20. Rotating the aluminum center plate 12 relative to a stationary steel ring gear 14 can generate frictional heat in the same way as before to soften the adjacent regions 52,54 of the annular body 36 and the axial rim 26 that, ultimately, are compressed together in the subsequent pressure application step to form the solid-state joint 16. Additionally, as part of the preheating step, some other heating technique besides induction heating may be performed to heat the inner surface 44 of the annular body 36 of the steel ring gear 14. Resistive heating the inner surface 44 is one potential alternative heating technique. Furthermore, the inner surface of the annular body 38 of the steel ring gear 14 and the outer surface 50 of the axial rim 26 of the circular body 18 may be cleaned prior to the preheating step.

Figure 7:
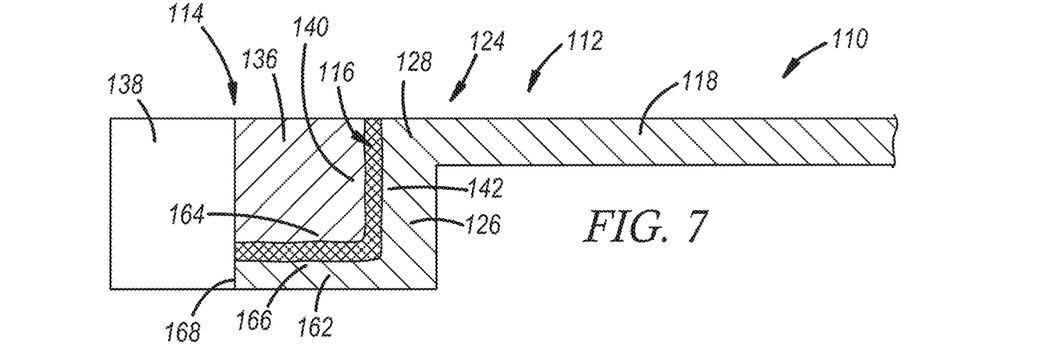
FIG. 7 is a partial cross-sectional view of a composite metal flexplate that includes an aluminum center plate and a steel ring gear disposed circumferentially around and affixed to a periphery of the aluminum center plate by a solid-state joint according to an another embodiment of the present disclosure.
Figure 8:
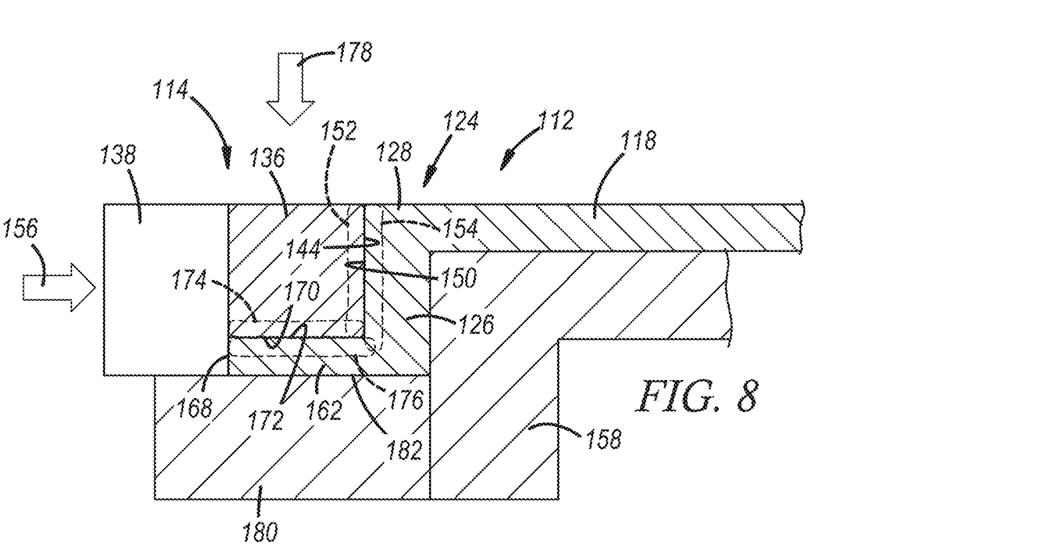
FIG. 8 is a partial cross-sectional illustration depicting several steps of the friction welding process during which the steel ring gear and the aluminum center plate shown in FIG. 7 are joined together.
Figure 9:
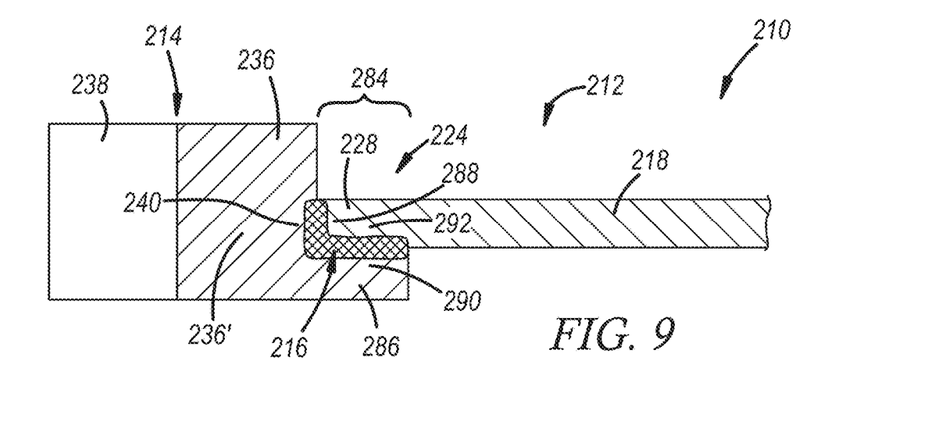
FIG. 9 is a partial cross-sectional view of a composite metal flexplate that includes an aluminum center plate and a steel ring gear disposed circumferentially around and affixed to a periphery of the aluminum center plate by a solid-state joint according to yet another alternative embodiment of the present disclosure.
Figure 10:
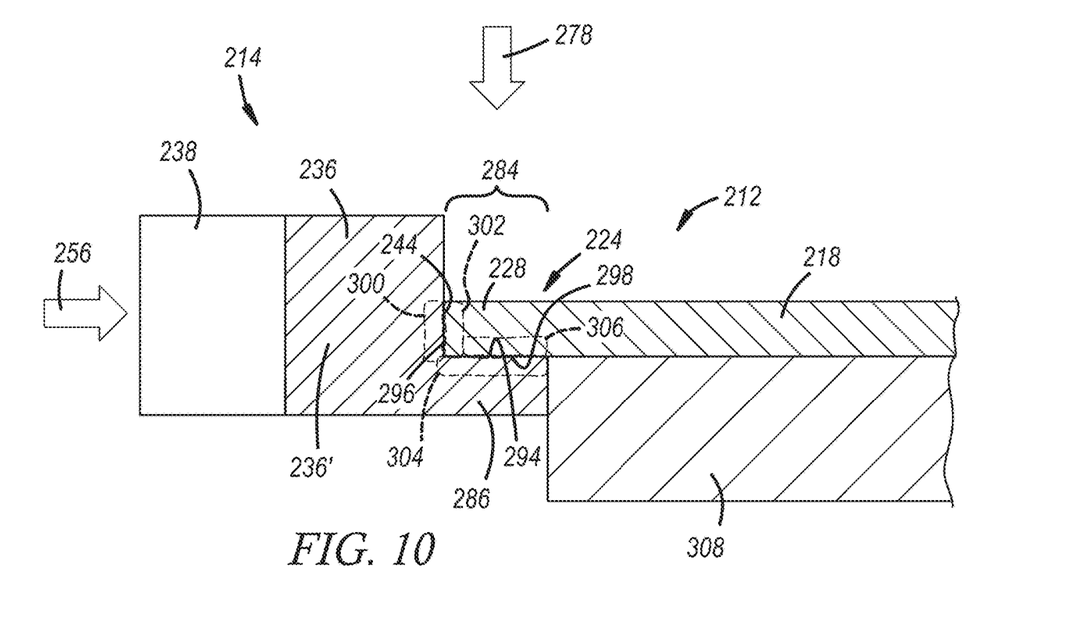
FIG. 10 is a partial cross-sectional illustration depicting several steps of the friction welding process during which the steel ring gear and the aluminum center plate shown in FIG. 9 are joined together.

In addition to the friction welding process, the composite metal flexplate formed therefrom is also subject to a number of possible variations. Two such embodiments are depicted in FIGS. 7-8 and 9-10. The composite metal flexplate depicted in FIGS. 7-8 is identified by reference numeral 110 and the composite metal flexplate depicted in FIGS. 9-10 is identified by reference numeral 210. Only the material differences of those composite metal flexplates 110,210 relative the composite metal flexplate 10 described above are discussed in detail below. Other features of those composite metal flexplates 110,210 that correspond in structure and function to features of the composite metal flexplate 10 described above in connection with FIGS. 1-3 are identified with corresponding 100 series (FIGS. 7-8) and 200 series (FIGS. 9-10) reference numerals. And, unless otherwise stated, the description of any features of the composite metal flexplate shown in FIGS. 1-3 applies equally to any features in the composite metal flexplates 110, 210 shown in FIGS. 7-8 and 9-10 that are identified with a corresponding 100 or 200 series reference numeral as if that discussion is fully repeated herein. The friction welding process described above in connection with FIGS. 4-6 is easily capable of forming each of the composite metal flexplates 110,210 shown in FIGS. 7-8 and 9-10.

Referring to the composite metal flexplate 110 shown in FIGS. 7-8, the periphery 124 of the circular body 118 of the aluminum center plate 112 includes an axial rim 126, as described above, along with a radial rim 162 that extends radially outwardly from the axial rim 126 and is axially offset from the distal end 128 of the body 118. The solid-state joint 116 (FIG. 7) that joins the steel ring gear 114 and the aluminum center plate 112 together may be established between (1) the inside wall portion 140 of the annular body 136 of the ring gear 114 and the outside wall portion 142 of the axial rim 126 of the circular body 118, (2) a sidewall portion 164 of the annular body 136 and a front wall portion 166 of the radial rim 162, or (3) both of the aforementioned locations as shown here. To accommodate the radial rim 162, the external gear teeth 138 may extend axially beyond the annular body 136 along the thickness dimension of the body 136 so that it covers an outer circumferential edge surface 168 of the radial rim 162, although this overhang of the external gear teeth 138 is not necessarily required. The inclusion of both the axial rim 126 and the radial rim 162 in the periphery 124 of the circular body 118 of the aluminum center plate 112 not only allows for the formation of a broader solid-state joint 116 between the center plate 112 and the steel ring gear 114, but also allows for the steel ring gear 114 and the aluminum center plate 112 to be more easily located relative to one another during friction welding.

The aluminum center plate 112 and the steel ring gear 114 can be friction welded together in essentially the same manner as described above using the same general friction welding tooling. Referring now specifically to FIG. 8, the inner surface 144 and/or a side surface 170 of the annular body 136 of the ring gear 114 may be pre-heated during the pre-heating step depending on where the metallurgical joint 116 is desired to be established. Next, the aluminum center plate 112 and the steel ring gear 114 are fixtured so that the pre-heated inner surface 144 and the pre-heated side surface 170 of the annular body 136 are in contact with the outer surface 150 of the axial rim 126 and a front surface 172 of the radial rim 162, respectively, as shown here. The aluminum center plate 112 and the steel ring gear 114 are then rotated relative to each other with one of the components 112, 114 being rotated and the other of the components 112, 114 being held stationary. The relative contacting rotational movement experienced between the surfaces 144, 150 and 170, 172 generates frictional heat between those surfaces 144, 150 and 170, 172 and softens adjacent regions 152, 154 of the annular body 136 and the axial rim 126 and adjacent regions 174, 176 of the annular body 136 and the radial rim 162.

An applied force then presses together the inner surface 144 of the annular body 136 and the outer surface 150 of the axial rim 126 (force 156), the side surface 170 of the annular body 136 and the front surface 172 of the radial rim 162 (force 178), or both, in the pressure application step. The applied force 156, 178 causes plastic deformation of the compressed softened regions 152, 154, 174, 176 to forge together their respective surfaces 144, 150 and 170, 172 to ultimately produce the solid-state joint 116. The applied force 156 acting on the surfaces 144, 150 of the annular body 136 and the axial rim 126 may be applied hydraulically by pressing radially-inwardly against the external teeth 138 of the steel ring gear 114 in opposition to the resisting force of the axial rim 126 of the circular body 118, as before, while the applied force 178 acting on the surfaces 170, 172 of the annular body 138 and the radial rim 162 may be applied by hydraulically pressing axially against the annular body 138 of the steel ring gear 114 in opposition to the resisting force of the radial rim 162 of the circular body 118. A dimensional control member 158 may be disposed against the inner surface 160 off the axial rim 126 to counteract the pressure being applied radially-inwardly against the external teeth 138 of the ring gear 114 and to prevent distortion of the axial rim 126. Similarly, a dimensional control member 180 may be disposed against a back surface 182 of the radial rim 162 to counteract the pressure being applied axially against the annular body 138 and to prevent distortion of the radial rim 162.

Referring now to the composite metal flexplate 210 shown in FIGS. 9-10, the periphery 224 of the circular body 218 of the aluminum center plate 212 is an annular terminal region 284 that encompasses the distal end 228 of the body 218. Additionally, the annular body 236 of the steel ring gear 214 includes a main annular portion 236' and a radial rim 286 that extends radially inwardly from the main annular portion 236'. The radial rim 286 supports the periphery 224 of the circular body 218 of the aluminum center plate 212. The solid-state joint 216 (FIG. 9) that joins the steel ring gear 214 and the aluminum center plate 212 together may be established between (1) the inside wall portion 240 of the main annular portion 236' of the annular body 236 of the steel ring gear 214 and an edge portion 288 of the distal end 228 of the circular body 218, (2) a front portion 290 of the radial rim 286 of annular body 236 and a back portion 292 of the circular body 218, or (3) both of the aforementioned locations as shown here. In much the same way as the previous embodiment, the inclusion of the radial rim 286 as part of the annular body 238 of the steel ring gear 214 not only allows for the formation of a broader solid-state joint 216 between the aluminum center plate 212 and the steel ring gear 214, but also allows for the steel ring gear 214 and the aluminum center plate 212 to be more easily located relative to one another during friction welding.

The aluminum center plate 212 and the steel ring gear 214 can be friction welded together in essentially the same manner as described above using the same general friction welding tooling. Referring now specifically to FIG. 10, the inner surface 244 of the main annular portion 236' and/or a front surface 294 of the radial rim 286 of the annular body 236 of the ring gear 114 may be pre-heated during the pre-heating step depending on where the metallurgical joint 216 is desired to be established. Next, the aluminum center plate 212 and the steel ring gear 214 are fixtured so that the pre-heated inner surface 244 of the main annular portion 236' and the front surface 294 of the radial rim 286 are in contact with a circumferential edge surface 296 of the distal end 228 of the circular body 218 and a back surface 298 of circular body 218, respectively, as shown here. The aluminum center plate 212 and the steel ring gear 214 are then rotated relative to each other with one of the components 212, 214 being rotated and the other of the components 212, 214 being held stationary. The relative contacting rotational movement experienced between the surfaces 244, 296 and 294, 298 generates frictional heat between those surfaces 244, 296 and 294, 298 and softens adjacent regions 300, 302 of the main annular portion 236' and the circular body 218 and adjacent regions 304, 306 of radial rim 286 and the circular body 218.

An applied force then presses together the inner surface 244 of the main annular portion 236' and the circumferential edge surface 296 of the distal end 228 of the circular body 218 (force 256), the front surface 294 of the radial rim 286 and the back surface 298 of the circular body 218 (force 278), or both, in the pressure application step. The applied force 256, 278 causes plastic deformation of the compressed softened regions 300, 302, 304, 306 to forge together their respective surfaces 244, 296 and 294, 298 and to ultimately produce the solid-state joint 216. The applied force 256 acting on the surfaces 244, 296 of the main annular portion 236' of the annular body 236 and the circular body 218 may be applied hydraulically by pressing radially-inwardly against the external teeth 238 of the steel ring gear 214 in opposition to the resisting force of the distal end 228 of the circular body 218, while the applied force 278 acting on the surfaces 294, 298 of the radial rim 286 of the annular body 236 and the circular body 218 may be applied by hydraulically pressing axially against the circular body 238 of the aluminum center plate 212 in opposition to the resisting force of the radial rim 286 of the annular body 236. A dimensional control member 308 may be disposed against the circular body 218 of the aluminum center plate 212 radially inwards of the radial rim 286 of the annular body 236 of the steel ring gear 214, if necessary, to counteract the pressure being applied axially against the circular body 218 and to prevent distortion of the circular body 218.

In all of the embodiments described above, the contacting surfaces of the annular body 36, 136, 236 of the steel ring gear 14, 114, 214 and the periphery 24, 124, 224 of the circular body 18, 118, 218 of the aluminum center plate 12, 112, 212 that are rotated relative to one another and then pressed together to form the solid state joint 16, 116, 216 are illustrated as being parallel (surfaces 44, 50 in FIG. 5, surfaces 144, 150 in FIG. 8, and surfaces 244, 296 in FIG. 10) or perpendicular (surfaces 170, 172 in FIG. 8 and surfaces 294, 298 in FIG. 10) to the axis of rotation 22 of the manufactured composite metal flexplate 10, 110, 210. While this is certainly acceptable and may be practiced, other interfacial configurations are also possible. For instance, and referring now to FIG. 11, a generic annular body 336 of the steel ring gear and a generic periphery 324 of the circular body of the aluminum center plate are shown in relation to an axis of rotation 322 of that passes longitudinally through the central opening of the center plate. The surface 335 of the annular body 336 is meant to collectively represent the inner surfaces 14, 114, 244 of the annular bodies 36, 136, 236 described above, and the surface 325 of the periphery 324 of the circular body is meant to collectively represent the outer surfaces 50, 150 of the axial flange 126, 226 and the circumferential edge surface 296 of the circular body 218 described above. As shown, the surface 335 of the annular body 336 may be inclined relative to the axis of rotation 322 by an inclination angle α and, likewise, the surface 325 of the periphery 324 of the circular body may be inclined relative to the axis of rotation 322 by an inclination angle β.

Figure 12:
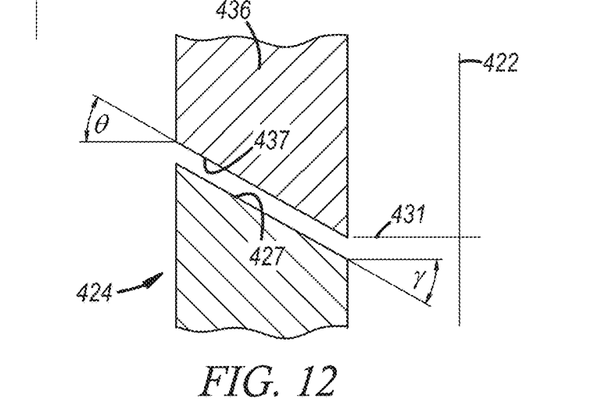
FIG. 12 is a partial cross-sectional depiction of a generic annular body of the steel ring gear and a generic periphery of the circular body of the aluminum center plate showing inclined contacting surfaces of those two components according to another embodiment of the present disclosure.

Separately, and referring now to FIG. 12, a generic annular body 436 of the steel ring gear and a generic periphery 424 of the circular body of the aluminum center plate are shown. The surface 437 of the annular body 436 is meant to collectively represent the side surface 170 of the annular body 136 and the front surface 294 of the radial rim 286 described above, and the surface 427 of the periphery 424 of the circular body is meant to collectively represent the front surface 172 of the radial rim 162 and the back surface 298 of the circular body 218 described above. As shown, the surface 437 of the annular body 436 may be inclined relative to a plane 431 normal to the axis of rotation 422 by an inclination angle θ and, likewise, the surface 427 of the periphery 424 of the circular body may be inclined to the plane 431 normal to the axis of rotation 422 by an inclination angle γ. Each of the inclination angles α, β, θ, γ may be greater than 0° independently of each other and, if implemented, may range anywhere from 10° to 80° or, more narrowly, from 30° to 60°.

Figure 11:
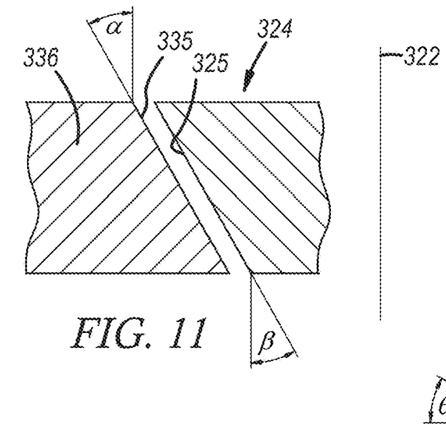
FIG. 11 is a partial cross-sectional depiction of a generic annular body of the steel ring gear and a generic periphery of the circular body of the aluminum center plate showing inclined contacting surfaces of those two components according to one embodiment of the present disclosure.

The inclination angles α, β, θ, γ may be utilized to increase the area between the surface 335, 437 of the annular body 336, 436 and the surface 325, 427 of the periphery 324, 424 of the circular body when those surfaces 325, 335 and 427, 437 are pressed and forged together during the pressure application step. In this way, a more extensive solid-state joint may be established, which may result in a stronger and more robust joint. To that end, when the inclination angles α, β are adapted to enhance the joining area, the surface 335 of the annular body 336 and the surface 325 of the periphery 324 of the circular body are inclined in the same direction relative to the axis of rotation 322 to maintain a confronting relationship, as shown in FIG. 11, with their respective inclination angles α, β being the same or differing from one another by up to 15°. The same general conditions apply when the inclination angles θ, γ are adapted to enhance the joining area; that is, the surface 437 of the annular body 436 and the surface 427 of the periphery 424 of the circular body are inclined in the same direction relative to the plane 431 normal to the axis of rotation 422 to maintain a confronting relationship, as shown in FIG. 12, with their respective inclination angles θ, γ being the same or differing from one another by up to 15°.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A composite metal flexplate comprising:
   an aluminum center plate having a circular body that defines a central opening about an axis of rotation of the composite metal flexplate, the circular body having a periphery; and
   a steel ring gear that includes an annular body and external gear teeth that are integral with and circumferentially disposed about the annular body, the annular body of the steel ring gear being affixed to the periphery of the circular body of the aluminum center plate by a solid-state joint,
   wherein the periphery of the circular body of the aluminum center plate comprises an axial rim that extends axially from a distal end of the circular body, wherein the axial rim is perpendicular to the circular body and parallel to the axis of rotation, and wherein the solid-state joint is established between the axial rim of the circular body and the annular body of the steel ring gear.

2. The composite metal flexplate set forth in claim 1, wherein the circular body of the aluminum center plate defines a central opening about an axis of rotation of the composite metal flexplate, a first set of mounting holes proximate the central opening, and a second set of mounting holes proximate the periphery of the circular body.

3. The composite metal flexplate set forth in claim 1, wherein the solid-state joint comprises no Fe—Al intermetallic compounds.

4. The composite metal flexplate set forth in claim 1, wherein the solid-state joint is parallel to the axis of rotation.

5. A composite metal flexplate comprising:
   an aluminum center plate having a circular body that defines a central opening about an axis of rotation of the composite metal flexplate, the circular body having a periphery; and
   a steel ring gear that includes an annular body and external gear teeth that are integral with and circumferentially disposed about the annular body, the annular body of the steel ring gear being affixed to the periphery of the circular body of the aluminum center plate by a solid-state joint,
   wherein the periphery of the circular body comprises an axial rim that extends axially from a distal end of the circular body, wherein the axial rim is perpendicular to the circular body, and further comprises a radial rim that extends radially outwardly from the axial rim and is axially offset from the distal end of the circular body, wherein the radial rim is perpendicular to the axial rim and parallel with the circular body and wherein the solid-state joint is established between at least one of the axial rim or the radial rim of the circular body of the aluminum center plate and the annular body of the steel ring gear.

6. The composite metal flexplate set forth in claim 5, wherein the solid-state joint is established between both the axial rim and the radial rim of the circular body of the aluminum center plate and the annular body of the steel ring gear to form an L-shaped solid-state joint.

7. A composite metal flexplate comprising:
   an aluminum center plate having a circular body that defines a central opening about an axis of rotation of the composite metal flexplate, the circular body having a periphery; and
   a steel ring gear that includes an annular body and external gear teeth that are integral with and circumferentially disposed about the annular body, the annular body of the steel ring gear being affixed to the periphery of the circular body of the aluminum center plate by a solid-state joint,
   wherein the annular body of the steel ring gear includes a main annular portion and a radial rim that extends radially inwardly from the main annular portion, wherein the radial rim is perpendicular to the main annular portion, and wherein the solid-state joint is established between the circular body of the aluminum center plate and at least one of the main annular portion or the radial rim of the annular body of the steel ring gear.

8. The composite metal flexplate set forth in claim 7, wherein the solid-state joint is established between the circular body of the aluminum center plate and both the main annular portion and the radial rim of the annular body of the steel ring gear to form an L-shaped solid-state joint.

* * * * *